United States Patent [19]

Stacey et al.

[11] 4,295,190
[45] Oct. 13, 1981

[54] BANK SELECTION IN NATURALLY COMMUTATED THYRISTOR CONTROLLED STATIC POWER CONVERTERS

[75] Inventors: Eric J. Stacey, Penn Hills, Pa.; Donal E. Baker, American Township, Lima County, Ohio

[73] Assignee: Westinghouse Electric Corp., Pittsburgh, Pa.

[21] Appl. No.: 95,899

[22] Filed: Nov. 19, 1979

[51] Int. Cl.³ .............................................. H02M 5/27
[52] U.S. Cl. ...................................... 363/162; 363/79
[58] Field of Search .................. 363/34, 37, 78, 79, 363/159–162, 9–10

[56] References Cited

U.S. PATENT DOCUMENTS

| | | | |
|---|---|---|---|
| 3,467,850 | 9/1969 | Christiansen et al. | 363/162 |
| 3,568,033 | 3/1971 | Gyugyi | 363/161 |
| 3,593,106 | 7/1971 | Lafuze | 363/161 |
| 3,852,654 | 12/1974 | Gyugyi et al. | 363/161 |

OTHER PUBLICATIONS

Pelly, "Thyristor Phase-Controlled Converter and Cycloconverter", Wiley-Interscience, 1971, pp. 114–126, 190–203.

Primary Examiner—William M. Shoop
Assistant Examiner—Peter S. Wong
Attorney, Agent, or Firm—G. H. Telfer

[57] ABSTRACT

Firing pulses to the thyristors in the nonload carrying bank of a naturally commutated power circuit of a static power converter are inhibited only after the current therethrough actually goes to zero. Where the thyristors are arranged in pulse groups, the firing pulses to each group are inhibited separately and in some instances not all groups in the nonload carrying bank are inhibited. Termination of current flow through a thyristor group is determined by comparing the group output voltage with a composite signal representative of the intended group voltage which is generated by summing selected portions of the source voltages applied to the group. Further firing of the thyristors in the group is inhibited only after the difference between these two signals exceeds a preset threshold value for an interval at least equal in duration to the thyristor reverse recovery time.

13 Claims, 4 Drawing Figures

BANK SELECTION IN NATURALLY COMMUTATED THYRISTOR CONTROLLED STATIC POWER CONVERTERS

BACKGROUND OF THE INVENTION

1. Field of the Invention

This invention relates to static electrical power converters utilizing naturally commutated power circuits having positive and negative thyristor banks, and more particularly to a method and apparatus for bank selection in such converters.

2. Prior Art

A broad class of electrical apparatus known as static power frequency changers synthesize an output waveform of a desired stable or variable frequency from a multiphase AC voltage source of a different or varying frequency. A control circuit sequentially turns on a plurality of power switches connected to the individual phases of the source voltage to generate a number of component waveforms which are summed to produce the desired output waveform. One type of power switch commonly used in these frequency changers is the thyristor (also known as the silicon controlled rectifier or SCR) which, when properly biased, will conduct current in a forward direction in response to a firing pulse applied to a gate electrode and will continue to conduct current in the forward direction despite termination of the firing pulse until the flow of current is interrupted for a preset interval. The thyristors are commonly arranged in these frequency changers for natural commutation; that is, the firing pulses are generated at instants such that the phase voltage applied to the oncoming thyristor is sufficient to commutate off the previously fired thyristor. Thus only properly phased firing pulses need be generated by the control circuit since turn off of the thyristors is inherent in the arrangement.

Examples of frequency changers using naturally commutated thyristor power circuits are dual converters and cycloconverters. The dual converter produces a controlled DC output signal which may be positive or negative while the cycloconverter generates a desired AC output waveform. Since both of these types of converters must generate output currents of both polarities and since the thyristor can only conduct current in one direction, the thyristors are arranged in positive and negative banks which carry the positive and negative load currents respectively.

Firing of the thyristors in a bank may, or may not, be inhibited when the load current is supplied by the other bank. If the thyristors in both banks are fired continuously, without any change to the basic firing control which is normally optimized to produce the best possible output waveform, a large magnitude interbank circulating current will develop which imposes an increased load on the converter and the voltage source. In the past, techniques employed to reduce the circulating current have shifted the optimized firing instants, leading to increased waveform distortion. Commonly owned, copending patent application of Stacey, et al., Ser. No. 095,820 filed concurrently herewith suggests that only the firing instants of the nonload carrying bank be shifted, thereby reducing the circulating current while producing an inherently better output waveform.

If firing of the thyristors in each bank is alternately enabled and inhibited appropriately in phase and synchronism with the load current, no continuous circulating current will be developed. This method of controlling the firing of the thyristor banks is commonly known as bank selection. In the basic form of bank selection, firing of the thyristors in the outgoing bank is inhibited and firing of those in the incoming bank is enabled as the output current of the converter passes through zero. Various techniques which have been developed for determining when to transfer the load from one bank to the other are discussed in *Thyristor Phase-Controlled Converters & Cycloconverters*, B. R. Pelly, Wiley-Interscience 1971, pages 114 to 126 and 198 to 203. U.S. Pat. No. 3,568,033 discloses apparatus for transferring the load from one bank to the other upon the occurrence of zero crossing points of the fundamental component of the AC output current waveform of a cycloconverter. U.S. Pat. No. 3,852,654 discloses an improvement in the apparatus of U.S. Pat. 3,568,033 which takes into account distortion due to load transients when determining the zero crossing points.

The prior art approaches to bank selection work well in converters operating from a source having more than adequate voltage, and the current is transferred smoothly from one bank to the other. Unfortunately, this smooth transition of current will not always take place if the source voltage is reduced to the minimum level required to fabricate the fundamental output waveform. Under these conditions, the current in the last conducting thyristors of the outgoing bank will sometimes not be driven to zero after their firing is inhibited. This has been determined to especially be a problem in converters in which the thyristors in each bank are divided into groups coupled to each other by interphase transformers. In this arrangement large fault currents can be developed with conventional bank selection in a manner to be discussed below.

It is common in converters utilizing bank selection to employ the controlled firing pulse overlap technique discussed at pages 190–198 in the Pelly book mentioned above. Under this technique, firing pulses are applied to both the positive and negative banks, thus permitting circulating current to flow, so long as the load current is instantaneously less than a prescribed level. Whenever the load current exceeds this "threshold" level, the firing pulses are automatically removed from the nonload carrying bank and the circulating current is inhibited. Under this technique, however, inhibiting of the firing pulses in the nonload carrying bank is not directly related to the actual condition of the bank and all of the thyristors in the bank are inhibited at the same time even where they are divided into groups. It is still possible under this technique for large fault currents to develop.

It is a primary object of the present invention to provide static converters having naturally commutated thyristor power circuits which operate without large interbank circulating currents and without the possibility of large fault currents.

It is another object of the invention to achieve these results using improved bank selection techniques.

It is a more particular object of the invention to provide bank selection wherein firing pulses to the thyristors in the nonload carrying bank are inhibited only after the current through these thyristors has actually gone to zero.

It is still another object of the invention to inhibit firing pulses independently to each thyristor group in the nonload carrying bank.

SUMMARY OF THE INVENTION

According to the invention, firing pulses to the thyristors in the nonload carrying bank of a naturally commutated static converter power circuit are not inhibited until the current therethrough actually goes to zero. This procedure is desirable because even though the fundamental load current has changed direction and is being supplied by the opposite thyristor bank, circulating current continues to flow through the nonload carrying bank. If firing pulses to the nonload carrying thyristor bank are inhibited before this current reaches zero, large fault currents can develop in a manner discussed in detail below. By waiting to inhibit firing pulses until the current in the nonload carrying thyristors is in fact zero, it is assured that harmful fault currents will not develop.

If the thyristors are arranged in pulse groups within the banks, the firing pulses to the individual banks are inhibited separately as the current in each group goes to zero. Under some circumstances, it is desirable that one thyristor group in the nonload carrying bank be fired continuously. This may be arranged by not providing a pulse inhibiting circuit for one thyristor group so that the same group is always continuously fired. Alternatively, means can be provided for individually inhibiting each thyristor group in a two group bank with additional means responsive to the operation of one such inhibiting means for preventing the second inhibiting means from being effective. In this manner a random selection of the group to be continuously fired is made. As will be explained in detail, the circulating current generated when one pulse group has been inhibited is much less than that which is generated with all of the thyristor groups in the idle bank being fired continuously.

While the currents through the individual thyristor groups in the nonload carrying bank could be measured directly, they are very small in magnitude and it is difficult to determine by direct current measurement when conduction has ceased. However, we have developed a novel approach to determining when the current in a nonload carrying group goes to zero based upon the following observations. When the thyristors in a group are conducting, the group output voltage will be very close to the group input voltage since the forward drop of the thyristors is very small. Conversely, when the group has ceased conducting, the voltage at the output of the group will be determined by a combination of the voltages generated by the other thyristor groups in that bank if still conducting and by the thyristor groups in the other bank and will be substantially different from the group input voltage. Accordingly, a composite signal representative of the intended group output voltage is generated by summing selected portions of the source phase voltages applied to the group. This is accomplished by a simulator which is a multiplexer gated by the firing pulse signals generated for the group by the firing pulse control circuit. The composite signal generated by the simulator is compared with the actual group output voltage to generate a difference signal. When this difference signal is equal to or greater than a threshold value for a period at least equal in duration to the thyristor reverse recovery time indicating that the thyristors in the group have been reverse biased for a sufficient length of time to assure permanent termination of conduction, further firing pulses to the group are inhibited. This technique for determining when the current through a group of thyristors goes to zero could also be used in converters utilizing forced commutation between thyristors or other types of power switches.

In comparison to all other bank control approaches, the present invention has significant advantages. It allows thyristors and source currents, source voltage and resulting losses to be positively minimized, therefore allowing the size and weight of a system to be minimized and the efficiency increased. Unlike the continuous firing approaches, in which circulating current can be minimized if the input voltage is increased, this invention only requires a level of input voltage necessary to fabricate the required output.

DESCRIPTION OF THE PREFERRED EMBODIMENTS

Figure 1:
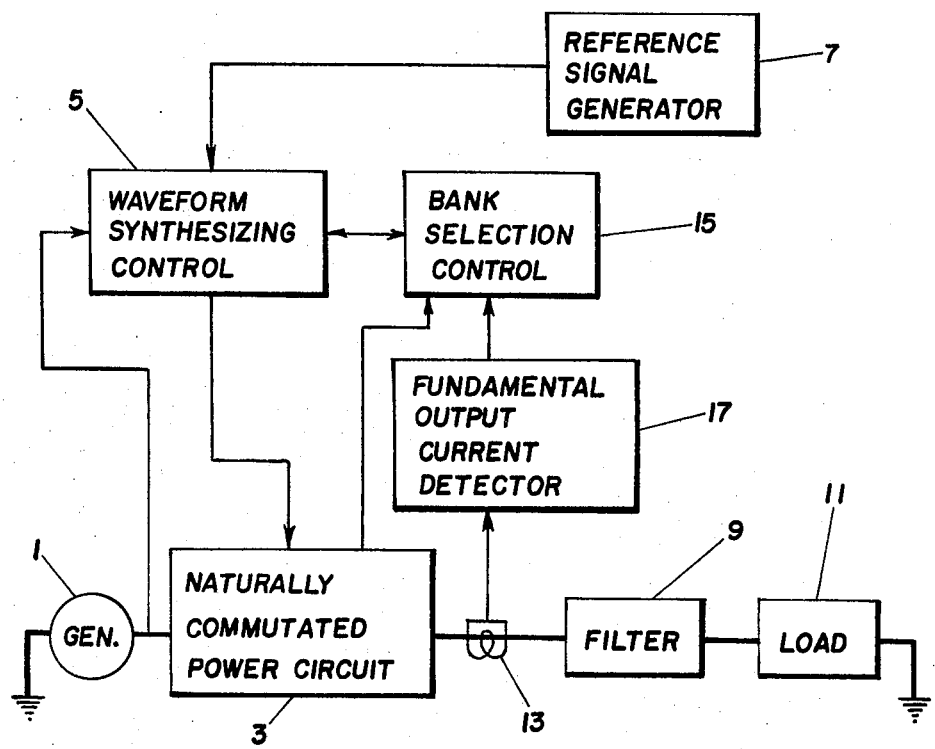
FIG. 1 is a schematic circuit diagram in block diagram form of a cycloconverter incorporating the present invention.

For the purpose of illustration, the invention will be described as applied to the cycloconverter shown in block diagram form in FIG. 1, although it is to be understood that it is equally applicable to other static converters using naturally commutated thyristor power circuits. The generator 1 is a six phase AC generator driven by a prime mover (not shown) at a variable RPM to produce a six phase source voltage of varying frequency. The six phase source voltage is applied to a naturally commutated power circuit 3 which includes an array of naturally commutated thyristors to be described below, and to a waveform synthesizing control 5 which sequentially generates firing pulses for the thyristors of the power circuit 3. The firing pulses are generated at instants which are phase related to the generator voltages as a function of the magnitude, phase and frequency of a reference voltage applied to the waveform synthesizing control by a reference signal generator 7 such that an output waveform having a mean value equal to the reference voltage is produced by the power circuit from selected portions of the generator phase voltages. In the particular case, the reference voltage is a fixed frequency AC signal so that a constant frequency output waveform is produced despite variations in the frequency of the generator voltages. Such a cycloconverter is useful, for instance, in an aircraft electric power generation system where a stable AC supply voltage must be obtained from a generator driven by an aircraft engine at variable RPM. The output of the power circuit 3 is filtered by filter 9 to remove the ripple before it is applied to a load 11.

Bank selection is provided in the cycloconverter of FIG. 1 by a bank selection control circuit 15 which inhibits on an individual basis the application of firing pulses from the waveform synthesizing control 5 to the separate groups of thyristors in the nonload current carrying thyristor bank in the power circuit 3. The bank selection control utilizes a signal from a fundamental output current detector 17 which provides an indication of which thyristor bank is carrying the load current at any given instant. This determination can be made by the prior art methods of establishing the instants of zero crossing of the load current. U.S. Pat. No. 3,852,654 discloses a preferred arrangement for making this determination and is hereby incorporated by reference into this application for the purpose of disclosing suitable means for determining the fundamental cycloconverter output current. Accordingly, a signal representative of the current through the capacitor in filter 9 as well as the output of current transformer 13 which is representative of the load current, are used by the nonload carrying bank detector 17 to determine which bank is carrying the load. As is known in the prior art, the output of the fundamental output current detector can be biased to provide pulse overlap near the zero crossing of the fundamental output current.

Figure 2:
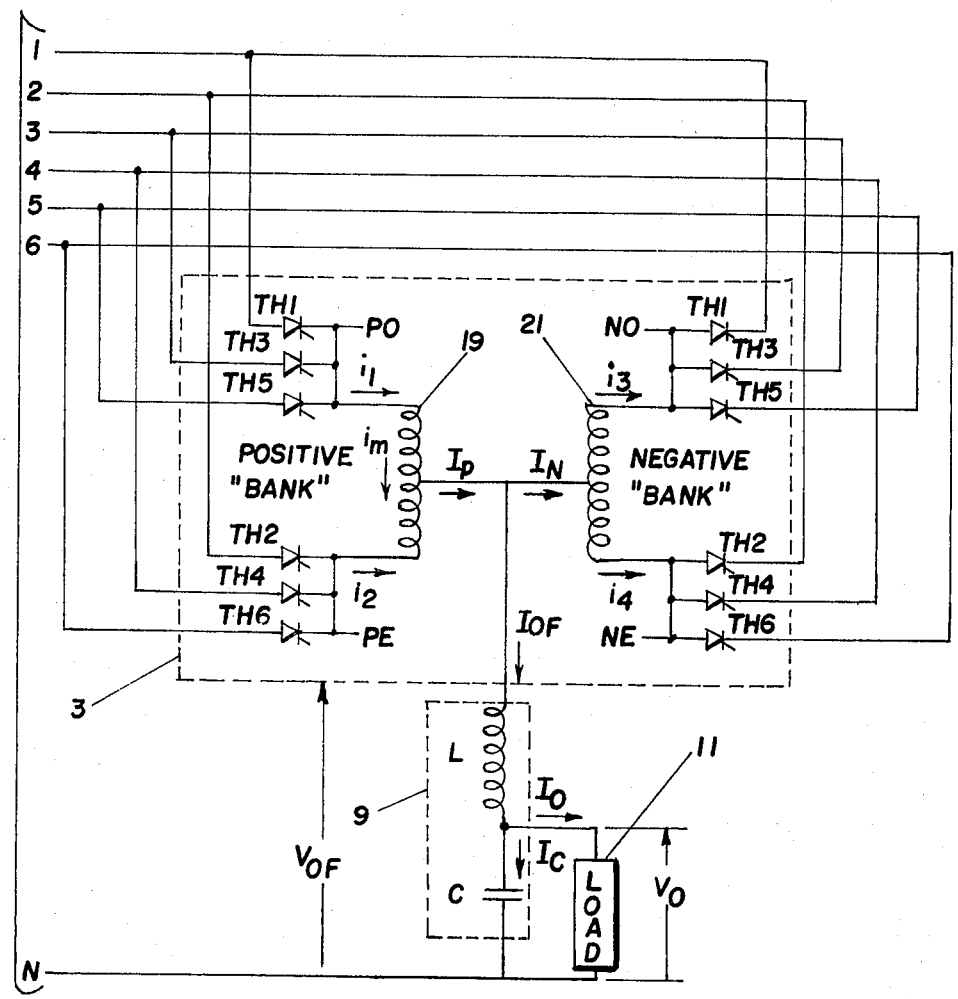
FIG. 2 is a schematic circuit diagram of the naturally commutated power circuit of the cycloconverter of FIG. 1.

FIG. 2 illustrates in greater detail the naturally commutated cycloconverter power circuit 3 in which the thyristors are divided into positive and negative banks. In the positive bank, the anodes of thyristor TH1 through TH6 are individually connected to the separate phases 1 through 6 of the six phase source voltage produced by the generator. The cathodes of the odd numbered thyristors TH1, TH3 and TH5 are connected together as are the cathodes of the even numbered thyristors TH2, TH4 and TH6, to form two, three-pulse groups of thyristors. The outputs of these two, three-pulse thyristor groups in the positive bank are applied to the opposite end terminals of an interphase transformer 19 to generate a composite output current $I_p$ at the center tap of the transformer. The thyristors in the negative bank are similarly arranged in odd and even three pulse groups with the outputs coupled by a center tapped interphase transformer 21, except that the polarity of the thyristors is reversed so that they may conduct current in the reverse direction relative to the positive bank. The currents $I_p$ and $I_n$ of the positive and negative thyristor banks are combined to produce the unfiltered output current $I_{OF}$. $I_{OF}$ is passed through the filter 9 comprising a series inductance L and shunt capacitor C to produce the filtered output current $I_o$ which is applied to the load 11.

In converters employing the prior art bank selection techniques, the thyristors of the nonload current carrying bank are turned off when the load current reverses polarity or very shortly thereafter where pulse overlap is employed. These prior art bank selectors work satisfactorily even with converters having interphase transformers, except when full modulation is required to produce the output waveform dictated by the reference voltage. While it appears under these circumstances that the current in the nonload carrying bank goes to zero, under certain conditions large fault currents can develop. Careful analysis has shown that in reality the current in the "off" bank really does not go to zero in one of the pulse groups and this establishes the conditions which lead to the generation of the fault currents.

This above phenomenon can be explained as follows. When the bank selector terminates firing of the thyristors in the nonload carrying bank, the last fired thyristor in each thyristor group continues to conduct since a finite number of reverse bias volt-seconds are required to terminate conduction. Theoretically, conduction would cease in both pulse groups simultaneously as the load current reverses direction. However, due to the magnetizing current of the interphase transformer which opposes the current in one pulse group and enforces the current in the other, one group in the "idle" bank will be turned off while current continues to flow in the other group. This effect is illustrated as applied to the positive thyristor bank in FIG. 2 in which it can be seen that, for the instant under consideration, the magnetizing current $i_m$ opposes the current $i_2$ flowing in the even thyristor group and enforces the current $i_1$ in the odd group so that the current $i_2$ in the even group is driven to zero while one of the thyristors in the odd group continues to conduct. Now, when both pulse groups are conducting, the effective impedance of the thyristor bank is very low. However, as soon as one group of thyristors ceases conducting, the effective inductance for the last conducting thyristor in the other pulse group is the relatively high magnetizing inductance of the associated winding of the interphase transformer. Due to this high inductance, a very low level current continues to flow as the particular source voltage increases, in the case of an idle positive bank, and rises "above" the level of the output voltage. Under these circumstances, the current will build up slowly until the transformer core saturates due to the excessive volt-seconds developed across the winding. When the core saturates the effective inductance falls drastically and a large magnitude fault current will flow through this winding and into the opposite bank which is now supporting the load. This fault current can be of sufficient magnitude to destroy the thyristors.

Figure 3:
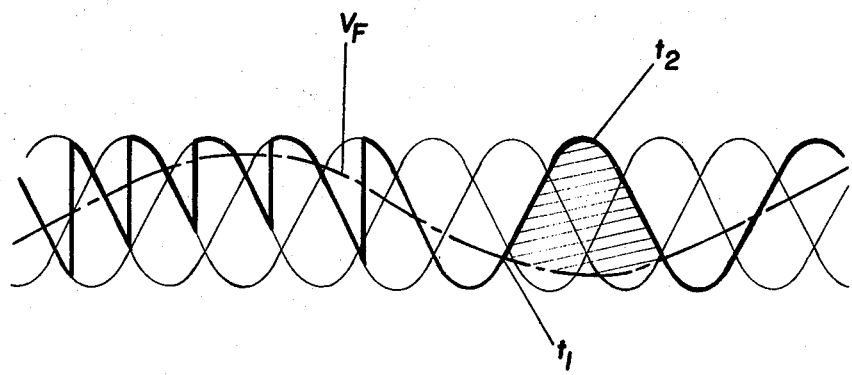
FIG. 3 is a waveform diagram illustrating the deficiencies of a cycloconverter power circuit similar to that shown in FIG. 2 when not adapted to operate in accordance with the teachings of the present invention.

The above sequence of events can be understood more clearly by referring to FIG. 3 which illustrates the three pulse waveform developed by the odd thyristor group in the positive bank. The dash dot sinusoidal waveform $V_F$ represents the fundamental output voltage which is the mean voltage generated by the positive and negative banks. Assume that as the positive bank goes into the inverting mode the firing pulses to that bank are inhibited and that the current in the last conducting thyristor does not go to zero because of the effective inductance of the interphase transformer. Thus, although this thyristor should have been commutated off before time $t_1$ in FIG. 3 by the voltage difference between the output and the associated phase of the generator, it does not turn off and the voltage PO at the output of the odd positive thyristor group continues to follow the associated phase voltage of the generator. Although this voltage rises well above the mean output voltage of the cycloconverter $V_F$, only a relatively small interbank circulating current flows due to the high impedance of the associated winding of the interphase transformer. However, as can be seen from FIG. 3, the voltage-seconds applied to the interphase transformer under these conditions, as represented by the cross hatched area in the figure, can reach the point where the core saturates. When this occurs, the impedance falls to a very low value and if there is a large difference between the associated phase voltage of the positive bank thyristor which remains on and the fundamental output voltage of the cycloconverter, a large fault current will be developed. The worst case would occur if, for instance, the interphase transformer core saturated at time $t_2$ as shown in FIG. 3 when the voltage differential is equal to almost twice the peak generator voltage. Such a large voltage differential applied across the very small impedance presented by the saturated core of the interphase transformer develops a very large fault current which may destroy the thyristors.

The present invention is based upon the realization that in view of the above analysis, all of the thyristors in the idle bank should not be inhibited at the same time but that each group of thyristors should be considered separately. Thus it has been determined that the pulses to a group of thyristors in the idle bank should not be inhibited until the current in that group has actually gone to zero. While the group current could be measured directly, it has been found that since these currents are very small in magnitude, it is more practical to compare the thyristor group output voltage with a waveform synthesized from the group input voltages to determine when conduction in the group has ceased. Although each group can be inhibited in this manner, it is possible to allow the last group to fire continuously. Since, as explained above, the impedance due to the interphase transformer is very high with the other group in the bank turned off, little circulating current flows under these conditions.

Figure 4:
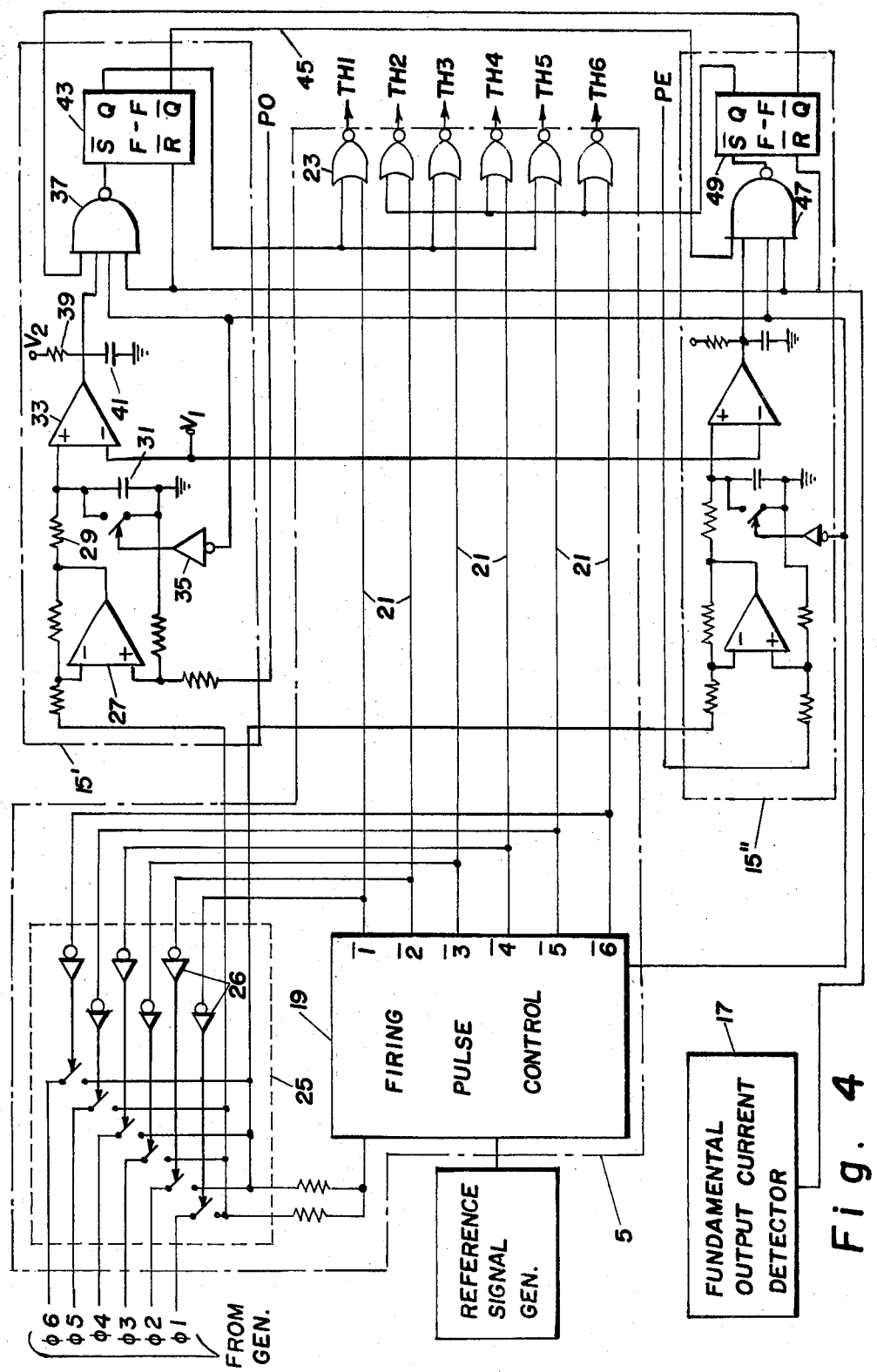
FIG. 4 is a schematic circuit diagram illustrating the details of, and the interaction between, the waveform synthesizing control and the bank selection control shown in FIG. 1.

FIG. 4 illustrates the details of the manner in which the thyristors in the idle bank are inhibited by group rather than as a unit. The waveform synthesizing control 5 includes a firing pulse control 19 which may be of any suitable type such as a cosine wave crossing control or an integral control. The commonly owned copending Stacey, et al. application Ser. No. 095,898 filed concurrently herewith, discloses a preferred form of integral control and is incorporated herein by reference for the purpose of disclosing the details of a complete control system. The firing pulse control 19 sequentially generates firing pulses on six leads 21, each of which is separately connected to a NOR element 23 that gates the pulse to the firing circuit associated with one of the thyristors TH1 through TH6. The outputs on the leads 21 are inverted signals as indicated and are interlocked such that each output goes low in sequence to generate a firing signal and stays low for two pulse counts. Thus each odd output goes low when pulsed and stays low until the next odd output goes low. Likewise, the even outputs stay low for two counts.

The outputs of the firing pulse control 19 are also fed to a simulator 25 in the waveform synthesizing control 5 comprising six analog switches 26 which gate portions of the generator phase voltages to the firing control circuit 5. As can be appreciated, the waveform thus applied to the firing pulse control simulates the composite waveform generated by the thyristor bank except that the simulator continues to apply a simulated signal to the firing pulse control even when firing of the thyristors is inhibited as discussed below. The firing pulse control compares the output of the simulator 25 with a reference signal from the reference signal generator 7 and generates the firing pulses at appropriate phase angles relative to the source voltages such that the mean value of the composite output waveform generated by the power circuit approximates the reference waveform.

Firing of the thyristors is inhibited by the application of an inhibit signal to the appropriate NOR gate 23 by the bank selection control 15. For purposes of illustration, the bank selection control is divided into one part 15' which generates inhibit signals for the thyristors in the odd group and a second part 15" for the even group. The circuit 15' compares the simulator composite signal for phases 1, 3 and 5 with the actual output PO of the odd thyristor group in the inverting comparator 27. It can be appreciated that the difference signal thus generated will be close to zero in magnitude if the group is still conducting, but that it will have an appreciable magnitude if the current in the group has dropped to zero. The difference signal is passed through a filter comprising a resistor 29 and a capacitor 31 and is applied to a second comparator 33. This filter eliminates noise and errors due to unmatched propagation delays and is reset by discharging the capacitor through an analog switch 35 each time a firing pulse is generated by the firing pulse control 19. This reset pulse may be generated at each clocking of the control as shown in FIG. 4 or it may be generated for each group separately in accordance with their respective firing pulse control outputs. The latter arrangement allows more opportunity for group inhibit to take place under marginal conditions.

The comparator 33 compares the filtered difference signal with a threshold signal $V_1$ which is selected so that an output is generated when the difference signal reaches a level sufficient to ensure that the reverse voltage needed to turn off the thyristors is present. The output transistor in the comparator 33 has an uncommitted collector such that it can only sink current. The comparator output is connected to the input of a NAND element 37 and to the junction between a pull up resistor 39 and a capacitor 41 which is charged to a voltage $V_2$. When the output of the comparator 33 is low indicating that the difference voltage is below the threshold voltage $V_1$, the capacitor 41 is discharged. On the other hand, when the output of the comparator 33 goes high, the capacitor charges toward $V_2$ at a rate dependent upon the RC time constant of capacitor 41 and resistor 39 such that after a preset interval NAND element 37 is gated. The parameters are selected such that the difference voltage must stay above the threshold voltage for an interval equal to the reverse recover time ($t_{rr}$) of the thyristors to assure that the thyristors have been reverse biased at a sufficient level for a sufficient period of time to permanently terminate conduction. The output of comparator 33 will gate the NAND element 37 to set a NAND flip-flop 43 if the NAND element 37 also receives a signal from the fundamental output current detector 17 which is high to indicate that the bank under discussion is the nonload carrying bank, and a signal from the firing pulse control 19 which is high to indicate that no firing pulse is being generated at that instant. For the moment, the fourth input to NAND 37 will be ignored. Setting of the flip-flop 43 applies an inhibit signal to the NOR elements 23 associated with the odd numbered thyristors. When the output of the nonload carrying bank detector 17 goes low indicating that the bank under consideration should now be carrying the load, the flip-flop 43 is reset to remove the blocking signal from the NOR gates. The above described technique for determining when the current in the naturally commutated group of thyristors goes to zero could also be applied to converters utilizing forced commutation of the thyristors or other static power switches.

The circuit 15" is similar to circuit 15' just described except that this circuit compares the simulator composite voltage for the even thyristor group with the even thyristor group voltage PE and generates an inhibit signal for the NOR gates 23 associated with thyristors TH2, TH4 and TH6.

Similar circuitry except for a reversal of the polarities on the comparators 33 and the reference voltage $V_1$, is used for the bank selection controls in the negative bank which compare simulator voltages for the negative thyristor groups with the actual negative group voltages NO and NE. With the circuitry thus far described, firing pulses to the separate thyristor groups in the nonload carrying bank are inhibited independently and only after the current in the individual group has gone to zero. While it may be noted that until the firing pulses are inhibited in the nonload carrying bank a circulating current will develop, this current periodically becomes zero and it is at these instants that the above circuitry is effective to terminate firing of the thyristors. There are conditions, however, where it is not desirable to inhibit the application of firing pulses to all the thyristor groups in the idle bank. For instance, when the source frequency is very high such that the half wave periods of the source become only two or three times the duration of the thyristor reverse recovery times, sufficient volt-seconds of reverse bias may not be applied to the last conducting thyristor in the idle bank to permanently commutate it off. If further firing pulses to the group containing this thyristor are inhibited, it is possible to develop fault currents in the manner described above. The solution to this problem is not to inhibit firing pulses to this last conducting group in the idle bank at all. Thus a circulating current will develop; however, since the effective inductance due to the interphase transformer is high with the other thyristor group inhibited, the magnitude of this current is very small and the additional load on the voltage source is negligible.

Inhibiting of the firing pulses to the last conducting thyristor group in the idle bank is prevented by applying the complementary output of the inhibit flip-flop for the first group to be inhibited to the NAND gate which sets the inhibit flip-flop for the other thyristor group. Thus, in FIG. 4, if the current in the odd thyristor group goes to zero first and the flip-flop 43 is set to inhibit further firing pulses to the thyristors in that group, the $\bar{Q}$ output of this flip-flop which goes low when the flip-flop is set is applied over lead 45 to the NAND gate 47 to block setting of the inhibit flip-flop 49 for the even group. Likewise, if the even group is inhibited first the $\bar{Q}$ output of its inhibit flip-flop 49 is applied to the NAND gate 37 of the odd selector control to block the inhibiting of pulses to that group. It is possible, of course, to apply this technique of not inhibiting firing of the thyristors in the last conducting idle thyristor group generally and not limit it to situations where the source frequency is very high. It should be clear too that a bank selection control could be provided for just one group in a two group bank so that the pulses to the same group would always be inhibited when the appropriate conditions existed while the circulating current would always flow through the other group. The invention is also applicable to converters wherein the thyristors are not arranged in groups within the positive and negative banks. Under these circumstances, it is still desirable to monitor the actual current in the nonload carrying bank and to only inhibit firing pulses to that bank after the current has gone to zero. Likewise, it will be appreciated by those skilled in the art that it is also within the scope of the invention to apply it to converters wherein the thyristors in each bank are divided into more than two groups.

As can be appreciated from the above discussion, the present invention provides stable, reliable integral control for static power frequency changers with a minimum of hardware. While specific embodiments of the invention have been described in detail, it will be appreciated by those skilled in the art that various modifications and alteratives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of synthesizing an output waveform from a multiphase AC voltage source comprising the steps of:
   generating firing pulses to sequentially fire a plurality of thyristors arranged in the positive and negative banks of a naturally commutated power circuit inserted between the AC voltage source and a load to generate a desired output waveform which is applied to said load, each of said positive and negative banks being arranged in thyristor groups interconnected by interphase transformers;
   determining which thyristor bank is carrying the load;
   determining when the current through each of said thyristor groups in the nonload carrying thyristor bank actually goes to zero;
   inhibiting the application of firing pulses to thyristors of said thyristor groups in the nonload carrying bank when the current through each respective group goes to zero.

2. The method of claim 1 wherein the step of determining when the current through a nonload carrying thyristor group goes to zero comprises the steps of generating a composite signal representative of the intended group output voltage by summing selected portions of the input phase voltages applied to the thyristor group and comparing said composite signal with the thyristor group output voltage and wherein firing pulses to the thyristors in the group are inhibited when said composite signal and said thyristor group output voltage differ by a preset amount.

3. The method of claim 2 wherein the firing pulses to the group are inhibited only when the difference between the composite signal and the thyristor group output voltage exceeds said predetermined amount for an interval at least equal in duration to the thyristor reverse recovery time.

4. A converter for generating from a multiphase AC voltage source a desired output waveform to be applied to a load, said converter comprising:
   a naturally commutated power circuit including a plurality of thyristors arranged in positive and negative banks inserted between the AC voltage source and the load, the thyristors in each thyristor bank being arranged in pulse groups interconnected by interphase transformers;
   control means for firing said thyristors sequentially to generate said desired output waveform which is applied to said load;
   means for determining which thyristor bank is carrying the load current;
   means for determining when the current in each pulse group of the nonload current carrying bank goes to zero; and
   means for inhibiting the firing of thyristors in each pulse group of the nonload current carry bank in response to zero current therethrough.

5. The converter of claim 4 wherein the means for determining when the current through a thyristor group in the nonload carrying group goes to zero includes means for generating a composite signal representative of the intended group output voltage by summing selected portions of the source phase voltages applied to said thyristor group and means for comparing said composite signal with the thyristor group output voltage and for generating an inhibit signal when the composite signal and the group output voltage differ by a predetermined amount, said means for inhibiting firing of the thyristors in the group being responsive to said inhibit signal.

6. The converter of claim 5 wherein said means for generating said composite signal comprises a separate switch connected to each of the source voltages applied to the thyristor group with the outputs of all of said switches connected together and means responsive to said control means for closing said switches individually when the control means fires the associated thyristor and for maintaining the switch closed until the next thyristor in the group is fired.

7. The converter of claim 5 including means for delaying generation of said inhibit signal until said difference between the composite signal and said thyristor group output voltage exceeds said predetermined amount for an interval equal in duration at least to the reverse recovery time of the thyristors.

8. The converter of claim 4 or 7 including means for separately determining when the current in each thyristor group in the nonload carrying bank goes to zero and means for separately inhibiting firing of the thyristors in each such group in response to zero current therethrough.

9. The converter of claim 8 wherein there are two thyristor groups in the nonload carrying bank and the means for separately inhibiting firing of the thyristors in each nonload carrying group includes means which preclude inhibiting firing pulses to both nonload carrying thyristor groups at the same time.

10. The converter of claim 4 including means for activating said inhibit means and means responsive to said control means for preventing operation of said activating means at instants when said control means attempt to fire a thyristor in the nonload carrying bank.

11. The converter of claim 4 including means for activating said inhibit means and means responsive to said control means for preventing operation of said activating means at instants when said control means attempt to fire a thyristor in said one group.

12. Apparatus for determining when the current has gone to zero in a group of power switches in a static power converter where the power switches are connected to individual phases of a multiphase AC source voltage and are switched on sequentially to generate a desired output waveform from selected portions of the multiphase source voltage, said apparatus comprising:
a separate control switch connected to each phase of the AC source voltage applied to said group of power switches;
means for closing each control switch individually when the power switch connected to the associated source phase voltage is turned on and for turning off said control switch when the next power switch in the group is switched on;
means for summing the voltages produced at the outputs of said group of control switches to form a composite signal; and
means for comparing said composite signal with the output voltage of said group of power switches and for generating an output signal indicating that the current through the group of power switches has gone to zero when said composite signal and the group output voltage differ by a predetermined amount.

13. The apparatus of claim 12 including means for delaying generation of said output signal until said difference between the composite signal and the group output voltage differ by said predetermined amount for a preselected interval.

* * * * *